Inventors
ESMOND P. G. WRIGHT
WINCENTY BEZDEL
By [signature]
Attorney

Inventors
ESMOND P. G. WRIGHT
WINCENTY BEZDEL
By [signature]
Attorney

INVENTORS
ESMOND P. G. WRIGHT
WINCENTY BEZDEL
BY Percy P. Lantzy
ATTORNEY

INVENTORS
ESMOND P. G. WRIGHT
WINCENTY BEZDEL
BY [signature]
ATTORNEY

INVENTORS
ESMOND P. G. WRIGHT
WINCENTY BEZDEL
BY [signature]
ATTORNEY

United States Patent Office 3,416,080

Patented Dec. 10, 1968

3,416,080

APPARATUS FOR THE ANALYSIS OF WAVEFORMS

Esmond Philip Goodwin Wright and Wincenty Bezdel, London, England, assignors to International Standard Electric Corporation, New York, N.Y., a corporation of Delaware

Filed Mar. 2, 1965, Ser. No. 437,349
Claims priority, application Great Britain, Mar. 6, 1964, 9,638/64
5 Claims. (Cl. 324—77)

ABSTRACT OF THE DISCLOSURE

In a zero-crossing type pitch detector, the time interval between zero-crossings is measured on a non-linear time scale by counting pulses that occur within the interval, the pulses being of successively longer duration.

This invention relates to apparatus for the analysis of waveforms, and finds application in the analysis of speech waveforms for speech recognition equipments.

According to the invention there is provided apparatus for analysing waveforms which includes means for detecting a plurality of recurrent features of the waveform, and means for measuring the intervals between successive occurrences of said features.

In one embodiment of the invention apparatus for analysing waveforms includes means for detecting reversals of polarity in the waveform, means for generating a measuring timescale waveform when a reversal is detected and means for counting the number of timescale units generated between the detected reversal and the next detected reversal.

The invention also provides apparatus for analysing waveforms including means for selecting and sorting the measured intervals into classes of like significance, i.e., conforming to a particular pattern as determined by the duration of said intervals.

A feature of the invention is the generation of a non-linear timescale waveform, wherein the timescale counting rate is directly or indirectly proportional to the frequency of the waveform to be analysed.

Embodiments of the invention will be described with reference to the accompanying drawings, in which FIG. 1 illustrates a typical speech waveform and the timing of the zero-crossings contained therein, FIG. 2 illustrates an alternative method of locating the zero-crossings in the waveform, FIG. 3 is a non-linear timescale, FIG. 4 is a block diagram of a circuit arranged to time the intervals between successive zero-crossings in a waveform, FIG. 5 illustrates a method of extracting zero-crossings from the waveform, FIG. 6 is a circuit by which the square wave shown in FIG. 5 may be obtained, FIG. 7 is a block diagram of a circuit by which a limited number of parts of speech may be recognised, FIG. 8 is a block diagram of an arrangement by which a larger vocabulary may be recognised, and FIGS. 9 and 10 illustrate sections of FIG. 8.

A fundamental aspect of speech recognition is the ability to extract from a speech waveform features such as frequencies, amplitudes, phase relationships etc., which can be recognised as conforming to certain known patterns for each type of speech sound. These features can be extracted and, with the aid of modern computers, measured, classified, stored and compared with various standards of reference patterns.

One method of analysing speech waveforms for the purpose of extracting recognisable features therefrom is to count and measure the intervals between zero-crossings of the waveform. A refinement of this technique is to count the number of combinations of zero-crossing intervals that conform to a particular pattern. For example the speech waveform may be analysed to ascertain the number of adjacent pairs of zero-crossing intervals where the first interval falls within the range between 1 and 1.5 msec. and is followed by an interval that falls within the range between 0.5 and 0.7 msec.

FIG. 1 illustrates a speech waveform 11 having zero crossings 12 to 20. The intervals between these zero crossings are represented as periods of time 21 to 28. The timing of these intervals is achieved by counting the number of timescale units generated by a timescale which is started when a zero-crossing is detected. Thus interval 21 is timed as being 1 timescale unit in duration, while interval 24 is 3 timescale units in duration.

Whilst it has been assumed that the intervals between the actual zero crossings can be timed and counted, in practice it may be found that unwanted noise in the waveform will produce spurious zero-crossings. To overcome this it can be arranged that instead of detecting the actual zero-crossings, the analysis is based on the detection of those points where the waveform alternately exceeds positive and negative threshold amplitudes. This is illustrated in FIG. 2, in which the waveform 31 is depicted as crossing the positive threshold at points 32, 34, 36, 38 and 40, and crossing the negative threshold at points 33, 35, 37 and 39. This arrangement can be adopted because most of the noise in the waveform is of small amplitude compared with the speech waveform. Therefore the threshold values can be chosen so that the noise content of the waveform lies between them, and detection of the points 32 to 40 will not include spurious zero-crossings. It will be noted that the threshold crossings do not depart significantly from the zero-crossings, and in practice the intervals between the threshold crossings will be substantially the same as the intervals between the zero-crossings.

Therefore, for the remainder of this specification the term "zero-crossings" will be used to denote both actual zero-crossings and threshold crossings.

It has been stated above that the intervals between zero-crossings are timed by counting timescale units, the timescale being started afresh in each case when a zero-crossing is detected.

The relation between the measured interval $Z_t$, the counting period $t_c$, and the count number $n$ is:

$$Z_t < t_c(n+1)$$

It should be noted that $Z_t = 1/2_f$ where $f$ is the frequency of the zero-crossing wave.

Considering the lower and upper end frequencies of this wave, namely, $f_1$ and $f_2$, then $$f_1 = \tfrac{1}{2} f_c (n+1)^{-1}$$

$$f_2 = \tfrac{1}{2} f_c n^{-1}$$

where $f_c$ is the counting rate, or pulse repetition frequency in the case of a pulse timescale.

Thus $f_0 = \tfrac{1}{4} f_c (2n+1) n^{-1} (n+1)^{-1}$ where $f_0$ is the centre frequency, and $B = (f_2 - f_1) = \tfrac{1}{2} f_c n^{-1} (n+1)^{-1}$ (bandwidth).

In the previous discussion, it was assumed that the counting rate was constant during the measured interval or channel. The principal disadvantage of this technique is that the accuracy of measurement depends directly upon the frequency of the signal to be measured. It can be seen that a low frequency or long interval will be measured very accurately compared with the measurement of a high frequency or short interval.

In terms of frequency bands, each count number at the lower end of the measured spectrum will produce a bandwidth which is too narrow, and each counter number at the higher end will produce a bandwidth which is too wide. For example, consider that the counting rate is 10 kc./s. The interval between two successive counts is equivalent to 5 kc./s. However, substitution for "$n$" in the preceding formulae shows that where $n$ is equal to 1, the band is equivalent to 2,500 to 5,000 c/s. Similarly it is possible to show that for $n=15$ the frequency band is 300 to 330 c./s.

In any practical application of this counting technique, it is most desirable to increase the number of counts for a high frequency, i.e. reduce the width of the band, and to decrease the number of counts for a lower frequency, i.e. increase the width of the band. A possible method of achieving this object is to use a non-linear measuring scale so that the counting rate is effectively different in adjacent channels.

The formulae which were derived previously for counting frequency, count number, etc., still apply. However, instead of using $f_c$, one has to substitute a function relating $f_c$ to either time, or to count number.

This function has the form $$f_c(n)=f_0(1+\log f(n))$$

where $f_0$ is the frequency of the first pulse.

Figure 1:
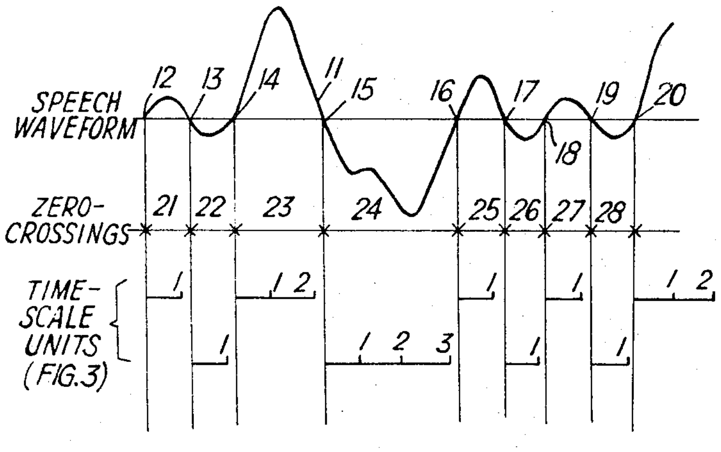

The equipments denoted by the various blocks in the drawings are known electronic circuits and do not in themselves constitute novel features of the invention.

Figure 2:
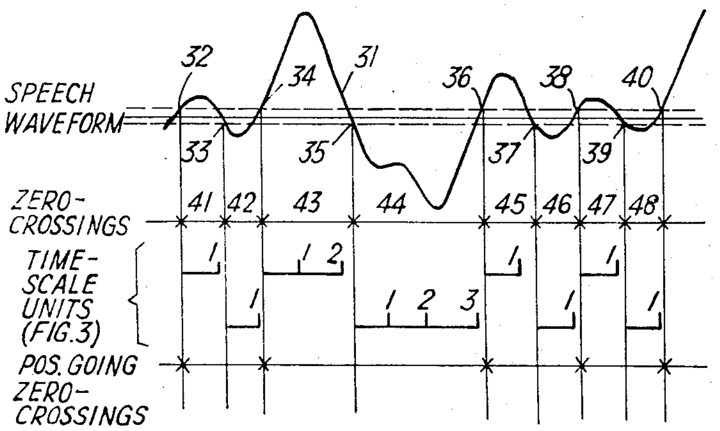
Figure 3:
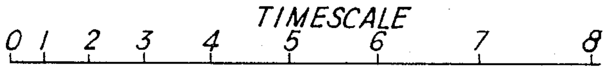
FIG. 3 depicts a non-linear timescale such as is used in FIGS. 1 and 2.
Figure 5:
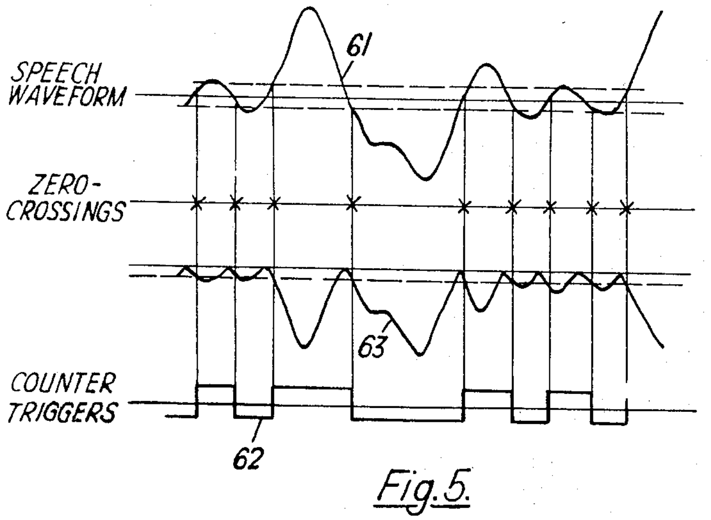

The incoming speech waveform 50 is fed to a wave-shaping circuit 51 used to identify the zero-crossing. The identification may be performed according to the procedures outlined with reference to FIG. 2. The output from the wave-shaping circuit may take the form of a square wave, as shown in FIG. 5. It will be seen that the waveform 61 in FIG. 5 can be used to produce a square wave 62 having the same zero-crossing characteristics as the waveform 61. Since zero-crossing analysis is independent of amplitude or other factors, a square wave of fixed amplitude having the necessary zero-crossing intervals makes a suitable trigger waveform for operating counters and other circuits.

Figure 6:
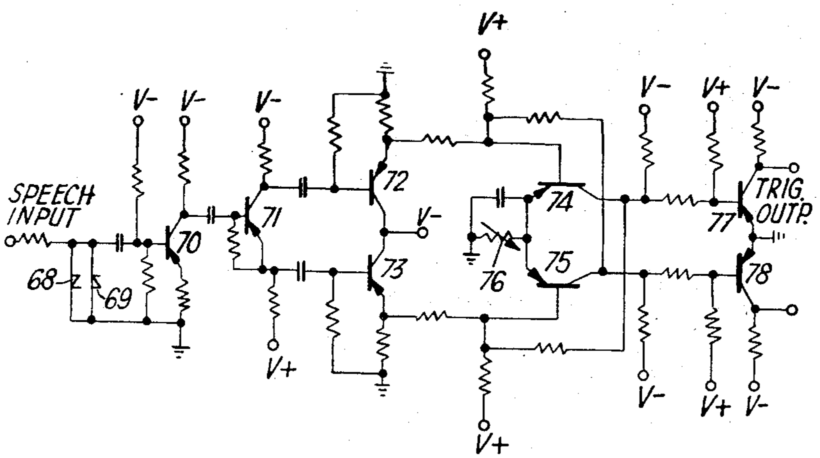

One method of producing the desired square wave is by utilising the circuit shown in FIG. 6. In this figure, transistor 70 operates as an amplifier for the speech input, which is limited by amplitude limiter diodes 68 and 69 so as to avoid overloading of the amplifier. Transistor 71 operates as a phase-splitter and converts the amplified and limited signal from transistor 70 into two outputs in opposite phase. These outputs are passed to two transistors 72 and 73 operating as emitter followers and arranged to reproduce negative going signals only. The waveform 63 of FIG. 5 represents the outputs of transistors 72 and 73 added together. These two outputs are taken to the inputs of a pair of trigger transistors 74 and 75. The trigger can be set to a threshold value which is adjustable by means of a potentiometer 76 in the common emitter connection of the two transistors. The outputs from the circuit are derived from two inverter transistors 77 and 78, and are represented by the square wave 62 in FIG. 5.

The circuit of FIG. 6 is biased where shown by voltages V+ or V−, all of equal amplitude with respect to ground.

Figure 4:
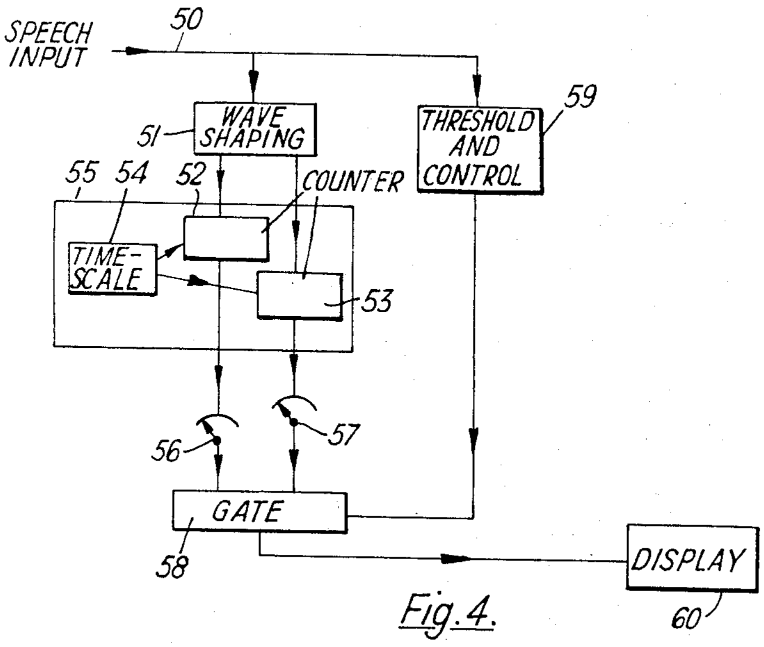
FIG. 4 illustrates by block diagrams a circuit for timing the intervals between successive zero crossings in a waveform such as that shown in either FIG. 1 or FIG. 2.

Reverting to FIG. 4, the output of the wave-shaping circuit is applied to a measuring circuit 55 which includes separate counting circuits 52 and 53, under the control of a timescale generating circuit 54.

As has been previously stated the timescale generated is non-linear, and recommences when each zero-crossing is detected. The counter 52 is arranged to count the timescale units following all zero-crossings going positive, and the counter 53 is arranged to count the timescale units following all negative going zero-crossings.

Switches 56 and 57 can be set to select the counts of either counter 52 or 53, and the selected count is passed through a gate 58 which is under the control of a threshold and control circuit 59. This threshold and control circuit is used to control the time during which an examination of zero-crossings is made. The results of each examination are displayed in a display counter 60, which registers the total number of zero-crossings which occur during examination time.

The equipment depicted in FIG. 4 can be arranged to make various types of examination of the speech waveform 50, for example (I) It can count the number of zero crossing intervals that fall into the time range between 1 msec. and 1.5 msec.

(II) It can count the number of combinations of intervals, such as those combinations where an interval of between 1 msec. and 1.5 msec. followed by an interval of between 0.5 msec. and 0.7 msec.

Figure 7:
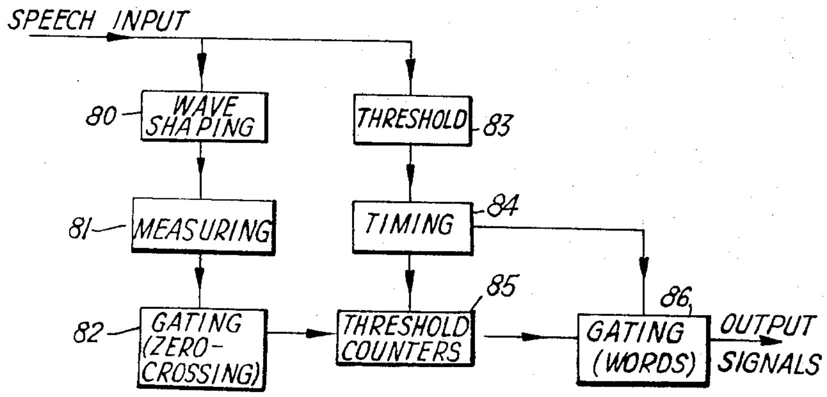

The recognition of simple parts of speech such as digits zero to nine, as opposed to simple waveform analysis, can be achieved by an arrangement such as that shown in FIG. 7. It consists of a squaring circuit 80 which identifies the zero-crossing intervals, a measuring circuit 81 which measures the zero-crossing intervals, and a gating circuit 82 which sorts the zero-crossing intervals into seven interval ranges, referred to as channels CH, as follows:

CH1—∞ to 1.31 msec.
CH2—1.31 to 0.93 msec.
CH3—0.93 to 0.73 msec.
CH4—0.73 to 0.42 msec.
CH5—0.42 to 0.31 msec.
CH6—0.31 to 0.18 msec.
CH7—0.18 to 0 msec.

A threshold circuit 83 provides "on" or "off" signals during the presence or absence of speech signals, and controls a timing circuit 84 which provides the following outputs:

(i) Output when speech signals persist more than 100 msec. (beginning of the word).

(ii) Output when speech signal is absent for more than 200 msec. (end of word).

(iii) Output (D1) for the first 100 msec. of the word.

(iv) Output (D2) for the 350 msec. following first 100 msec. of speech signal.

(v) Output (D3) for the first 100 msec. after a gap shorter than 200 msec.

A group of threshold counters 85 are set to count the number of zero-crossing intervals in a given channel. Each threshold counter produces an output when a threshold to which the counter is preset is reached. The following threshold counters (TC) are provided:

TC1 for CH1
TC2 for CH1+CH2
TC3 for CH3+CH4
TC4 for CH5
TC5 for CH6+CH7

Finally a gating circuit 86 is used to identify spoken digits according to the following patterns.

| Digit | Gate condition | | | | | | |
|---|---|---|---|---|---|---|---|
| | TC1D1 | TC2D1 | TC2D2 | TC3D2 | TC4D2 | TC5D2 | TC2D3 |
| Oh (O) | | 0 | 0 | | | | |
| One | | 0 | 0 | 1 | | | |
| Two | | 1 | 0 | | | 1 | |
| Three | 0 | 1 | 1 | 0 | 0 | | |
| Four | 0 | 1 | 0 | | | 0 | |
| Five | 0 | 1 | 1 | | 1 | | |
| Six | 1 | | | | | | 1 |
| Seven | 1 | | | | | | 0 |
| Eight | 0 | 1 | 1 | | 0 | | 1 |
| Nine | | 0 | 1 | | | | |

1 indicates presence of a parameter, 0 indicates its absence, and blank space means that presence or absence of a parameter is immaterial in the recognition.

Figure 8:
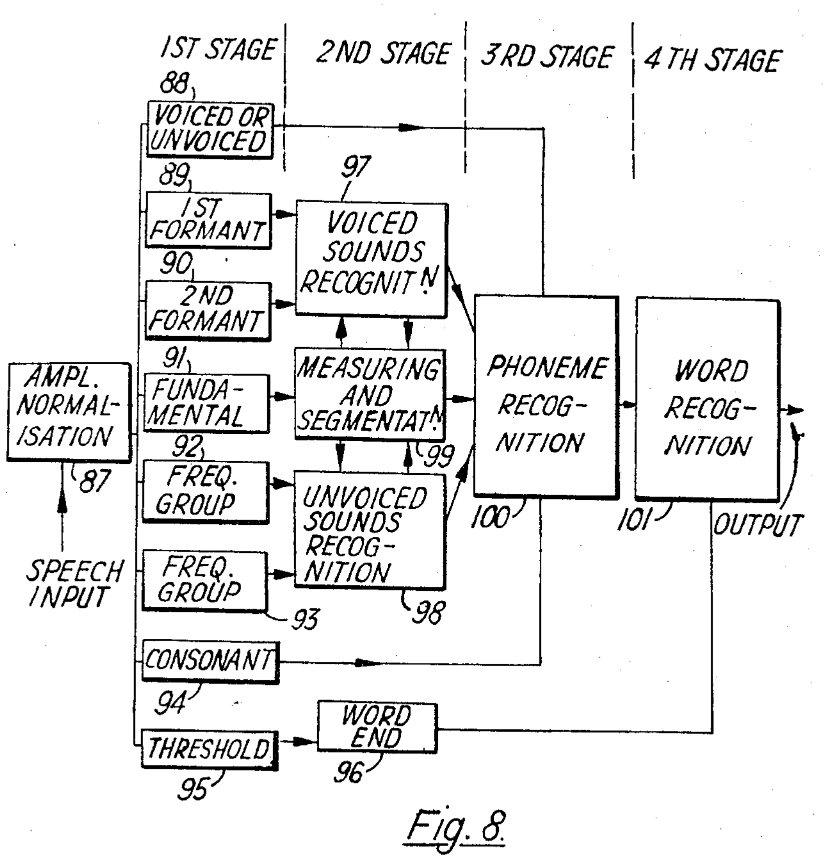

An arrangement for recognizing a larger vocabulary is illustrated in FIG. 8. The speech input passes through an amplitude normalization circuit 87. In this unit a wide range of amplitudes is reduced to a range than can be handled by the circuits in the first stage of the recognition process.

In the first stage there are a number of units 88 to 95 which perform broad classifications of speech characteristics. For example, the unit marked 88 classifies the voiced or unvoiced characteristics. Units 89 and 90 isolate the first and second frequency ranges corresponding to formants of vowel sounds respectively and pass the vowel information in the form of zero crossings. Unit 91 extracts the fundamental frequency of a talker. Units marked 92 and 93 extract two groups of frequencies with respect to unvoiced sounds, and unit 94 detects consonant groups. The unit 95 is a threshold detector and unit 96 is a word-end detector.

The complexity of the first stage in the classification of speech characteristics depends mainly on the size of vocabulary and the range of talkers. For example, for the recognition of vowels it may be sufficient to analyze only one frequency range.

In the second stage of the recognition process analysis is performed on the portions of speech which were separated in the first stage. This analysis leads to the recognition of specific voiced and unvoiced sounds by the recognition circuits 97 and 98. The analysis is performed during the time controlled by a sample A which covers a segment of sound. The same analysis is repeated for any subsequent segment of the speech wave. The length of each segment, e.g. sample A, is determined by the fundamental frequency of the talker. This is the function of the measuring and segmentation unit 99.

Figure 9:
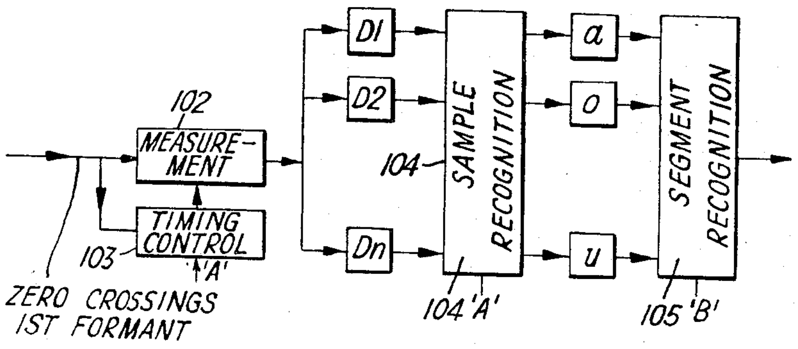

FIG. 9 shows in more detail a part of a vowel recognition arrangement. Information is derived from the zero crossings of the first formant and the analysis is done by measuring zero crossing distances and extracting only the significant ones. The zero crossing intervals are measured in the unit 102, and the timing control 103, controlled by sample pulse A, selects the period during which the zero crossing distances are measured. The significant zero crossing distances extracted by the unit 102 are stored in the storage units marked D1, D2 . . . D*n*. As has been stated above, the length of each sample of speech is determined by the fundamental frequency of the talker. The fundamental frequency also controls measurement of zero crossing distances. One sample constitutes the shortest recognizable portion of a sound. In the case of vowels these portions may be referred to as "little vowels." For example, during an uttering of the sound "a" recognition of a segment of the sound can consist of the following series of samples o, a,a,a,o This series is stored as three a's and two o's. The recognition of each sample is performed by the recognition circuit 104 under the control of the sample pulse A and when a sufficient number of samples have been recognized a complete group of samples, i.e. a segment, is recognized by the recognition circuit 105 under the control of a segment pulse B. The recognition of the group of samples given above, under the control of the segment pulse B, indicates that the unknown letter sound was "a." The segment B covers a number of samples A which is sufficient to make a decision on the unknown sound.

Recognition of a group of parameters, such as zero crossing distances or "little vowels" and so on, can be accomplished by a straightforward threshold circuit followed by logical gating or by a statistical decision circuit.

Figure 10:
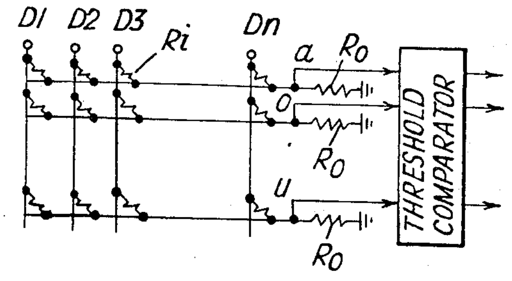

An example of the latter is shown schematically in FIG. 10. The output from each parameter (a parameter can be represented as either "1" or "0" voltage levels, or as an analogue or quantised voltage level) is taken via resistor $R_i$ to a point recognizing, for example, "a," "o" etc. The value of the resistor $R_i$ represents a weighted contribution of a given parameter to the recognition of "a," "o" etc., and is such that $$R_o/R_i \leqslant 1$$

where $R_o$ is a constant of the adding circuit. Contributions of $R_i$ should satisfy the expression $$\sum_i \frac{R_o}{R_i} = 1$$

for all *i*'s associated with a given point, say, "a," "o" etc.

Similarly the unvoiced sounds are recognized by the recognition circuit 98.

As in the first stage, complexity of the remaining stages in the recognition process is mainly related to the size of vocabulary and the range of talkers. For example, voiced, unvoiced and phoneme recognition can be reduced to one unit. The phoneme recognition circuit 100 and the word recognition circuit 101 are arranged on the same lines as previously described with reference to FIGS. 9 and 10. The main difference is that in each succeeding recognition sequence another set of parameters is brought into use from the preceding stage.

The number of stages in the recognition process is also related to the size of vocabulary and the range of talkers. In the recognition of a short selected vocabulary it may be quite feasible to recognize words directly, without dividing them into phonemes, voiced sounds, etc.

What we claim is:

1. Apparatus for analyzing a complex waveform comprising means for detecting reversals of the polarity of the waveform, means responsive to said detecting means for generating a non-linear time base made up of a series of pulses, each pulse successively longer than one which preceded it, means for counting the pulses thus generated, thereby measuring the time interval between reversals of the polarity of the waveform, and means for selecting and sorting the measured intervals into classes according to their duration.

2. Apparatus according to claim 1 which also includes means for counting a number of reversals of polarity during a chosen period of time.

3. Apparatus according to claim 1 which includes two separate timing means one of which is arranged to time portions of the waveform to be analysed which have a positive polarity, the other timing means being arranged to time portions having a negative polarity.

4. Apparatus according to claim 1 in which the time scale counting rate is proportional to the frequency of the waveform to be analysed.

5. Apparatus according to claim 1 including wave-shaping means for modifying the waveform to be analysed without significant alteration of the wave characteristics to be timed and counted.

References Cited

UNITED STATES PATENTS

| | | | |
|---|---|---|---|
| 3,278,685 | 10/1966 | Harper | 179—1 |
| 3,234,332 | 2/1966 | Belar | 179—1 |
| 2,974,281 | 3/1961 | Feldman | 324—77 |
| 3,102,928 | 9/1963 | Schroeder | 179—1 |
| 3,268,661 | 8/1966 | Coulter | 179—1 |

KATHLEEN H. CLAFFY, *Primary Examiner.*

R. P. TAYLOR, *Assistant Examiner.*

U.S. Cl. X.R.

179—1